United States Patent [19]

Watanabe

[11] Patent Number: 4,875,711
[45] Date of Patent: Oct. 24, 1989

[54] SLENDER TUBE CONNECTOR
[75] Inventor: Ikuo Watanabe, Susono, Japan
[73] Assignee: Usui Kokusai Sangyo Kaisha Ltd., Sunto, Japan
[21] Appl. No.: 185,447
[22] Filed: Apr. 25, 1988
[51] Int. Cl.[4] .............................................. F16L 55/00
[52] U.S. Cl. ...................................... 285/45; 285/86; 285/319
[58] Field of Search ...................... 285/86, 85, 319, 45; 403/315, 405.1

[56] References Cited

U.S. PATENT DOCUMENTS

| | | | |
|---|---|---|---|
| 3,169,030 | 2/1965 | Lippincott | 285/86 |
| 4,026,581 | 5/1977 | Pasbrig | 285/319 X |
| 4,074,912 | 2/1978 | Van Bilderbeek et al. | 285/86 X |
| 4,275,907 | 6/1981 | Hunt | 285/319 X |
| 4,451,069 | 5/1984 | Melone | 285/86 |
| 4,573,716 | 3/1986 | Guest | 285/45 X |

FOREIGN PATENT DOCUMENTS

| | | | |
|---|---|---|---|
| 593413 | 5/1959 | Italy | 285/86 |
| 855603 | 12/1960 | United Kingdom | 285/86 |

Primary Examiner—Thomas F. Callaghan
Attorney, Agent, or Firm—Anthony J. Casella; Gerald E. Hespos

[57] ABSTRACT

Herein disclosed is a connector for connecting a slender tube, which comprises: a connector body and a socket member. The connector body has: a connecting portion formed at its leading end to be connected to a base; a small hole formed at its leading end; a stepped connecting bore extending therethrough and expanded from the small hole; and an annular groove formed in the inner circumference of the connecting bore. The socket member is adapted to be removably inserted into the connecting bore of the connector body at its leading end and has: a cylindrical wall for engaging with a bulging wall of the connected end of a slender tube; and a plurality of free walls arranged at a spacing at the trailing end of the cylindrical wall elastically in an expanded manner. The free walls are formed on their outer circumference with a land, which is to be fitted in the annular groove when the tube is connected, and have their trailing end expanded to the outside from the peripheral edge of the trailing end of the connector body. Further comprised is an elastic cap member which has integral inner and outer cylindrical walls extending coaxially and adapted to be fitted on the tube such that its inner cylindrical wall is clamped between the free walls and the tube whereas its outer cylindrical wall is fitted on the outer circumference of the connector body.

6 Claims, 1 Drawing Sheet

PRIOR ART

SLENDER TUBE CONNECTOR

BACKGROUND OF THE INVENTION

1. Field of the Invention

The present invention relates to a tube connector and, more particularly, to an improvement in the structure of a connector for connecting a resin or metal tube having a relatively small diameter less than 15 mm to be arranged as a conduit for feeding oil or air to an automobile or a variety of machines or apparatus.

2. Description of the Prior Art

In the connector of this kind according to the prior art, as shown in FIG. 3, a connector body 21 is formed with a connecting threaded portion 22 on the outer circumference of its leading end, a stepped connecting bore 24 extending therethrough and expanded from and communicating with a small hole 23 formed at the leading end, and an annular groove 25 formed in the inner circumference of the rear portion of the connecting bore 24. Into the connecting bore 24 of the connector body 21, there is inserted a socket member 26 which is formed at its leading end with a cylindrical wall 27 for engaging with a bulging wall $T_1'$ of a tube $T_1$ and at the trailing end of the cylindrical wall 27 with a plurality of free walls which are arranged at a spacing elastically in an expanded manner. When the tube $T_1$ is connected, the outer circumference of the free walls 28 of the socket member 26 has its land 29 fitted removably in the annular groove 25 of the connector body 21. The trailing end of the free walls 28 is expanded to the outside from the circumferential edge of the trailing end of the connector body 21. Incidentally, reference numeral 30 designates a clearance between the free walls 28 and the outer circumference of the tube $T_1$.

The connector thus constructed according to the prior art can satisfy its intrinsic object to connect and disconnect the tube $T_1$ simply and quickly. On the other hand, however, the exposed structure that the trailing end of the free walls 28 is expanded with the land 29 being fitted in the annular groove 25 will probably cause the expanded end to be contacted, vibrated or shocked by another adjacent part, depending upon the state of arrangement, thereby to loosen the connection of the tube $T_1$ or allow it to come out. In use, moreover, dust or washing water is allowed to invade through the clearance 30 to damage the gas-tightness of the internal O-ring. If the tube is made of a metal, the water will locally rust the outer circumference of the connected portion in the connecting bore 24.

SUMMARY OF THE INVENTION

An object of the present invention is to provide a slender tube connector which is afforded, in addition to the advantage of the prior art to connect and disconnect a tube simply and quickly, functions to prevent the connected tube from coming out for a long time and from having its connecting bore invaded by dust or washing water.

According to the gist of the present invention, there is provided a connector for connecting a slender tube, which comprises: a connector body having a connecting portion formed at its leading end to be connected to a base, a small hole formed at its leading end, a stepped connecting bore extending therethrough and expanded from said small hole, and an annular groove formed in the inner circumference of said connecting bore; and a socket member adapted to be removably inserted into the connecting bore of said connector body at its leading end and having a cylindrical wall for engaging with a bulging wall of the connected end of a slender tube, and a plurality of free walls arranged at a spacing at the trailing end of said cylindrical wall elastically in an expanded manner, said free walls being formed on their outer circumference with a land, which is to be fitted in said annular groove when said tube is connected, and having their trailing end expanded to the outside from the circumferential edge of the trailing end of said connector body, wherein the improvement comprises an elastic cap member having integral inner and outer cylindrical walls extending coaxially and adapted to be fitted on said tube such that its inner cylindrical wall clamped between said free walls and said tube whereas its outer cylindrical walls is fitted on the outer circumference of said connector body.

With the construction thus made according to the present invention, the connector body is connected to a mating base, and an O-ring is fitted on the back of the bulging wall at the end portion of the tube to be connected. This socket member is inserted into the connecting bore of the connector body. As the expanded trailing end of the socket member is depressed, the O-ring is deformed to come into close engagement with the outer circumference of the tube and the bore circumference of the connector body so that the land of the socket member comes into fitted engagement with the annular groove. When the tube is to be disconnected, on the other hand, the expanded trailing end is pulled out, while being pinched inward, to disconnect the tube. Moreover, the elastic cap member fitted in advance on the tube is elastically clamped as a result of the relative movement between the free walls and the tube in the inner cylindrical wall 12 thereby to further ensure the engagement between the land and the annular groove tightly. At the same time, the covering structure of the connector body with the outer cylindrical wall can completely enclose the expanded trailing end of the free walls.

BRIEF DESCRIPTION OF THE DRAWING

FIG. 12 is a section taken along line A—A of FIG. 1; and

DETAILED DESCRIPTION OF THE PREFERRED EMBODIMENT

Figure 1:
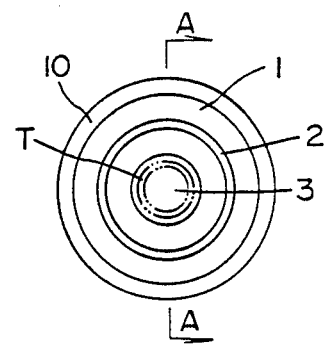
FIG. 1 is a front elevation showing the state in which a tube is connected by a slender tube connector according to one embodiment of the present invention.
Figure 2:
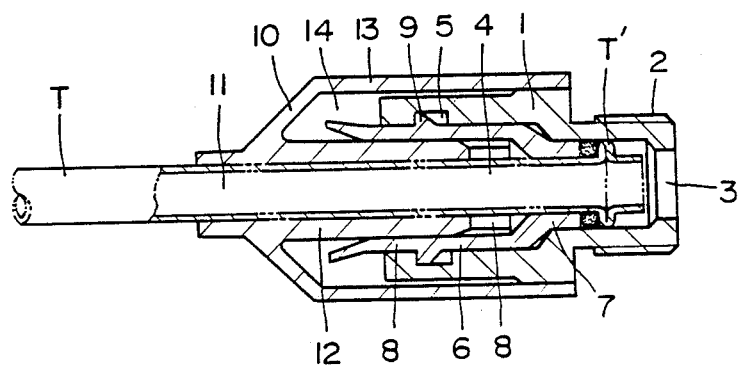
Figure 3:
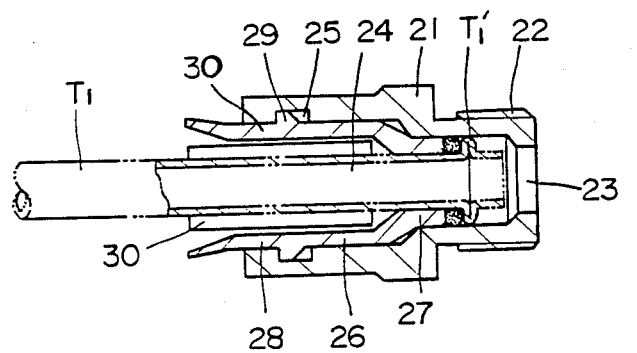
FIG. 3 is a longitudinal section showing the state in which a tube is connected by the slender tube connector according to the prior art.

In FIGS. 1 and 2, a connector body 1 is formed with a connecting threaded portion 2 on the outer circumference of its leading end, a stepped connecting bore 4 extending therethrough and expanded from and communicating with a small hole 3 formed at the leading end, and an annular groove 5 formed in the inner circumference of the rear portion of the connecting bore 4. Into the connecting bore 4 of the connector body 1, there is inserted a socket member 6 which is formed at its leading end with a cylindrical wall 7 for engaging through a not-numbered O-ring with a bulging wall T', e.g., a flange at the connected end of a resin or metal tube T and at the trailing end of the cylindrical wall 7 with a plurality of free walls which are arranged at a spacing elastically in an expanded manner. When the tube T is connected, the outer circumference of the free walls 8 of the socket member 6 has its land 9 fitted removably in the annular groove 5 of the connector body 1. The trailing end of the free walls 8 is expanded to the outside from the circumferential edge of the trailing end of the connector body 1. Designated at reference numeral 10 is an elastic cap member which is made of a resin or rubber. This cap member 10 is formed with a cap bore 11 and integral inner and outer cylindrical walls 12 and 13 which extend coaxially. These inner and outer cylindrical walls 12 and 13 are spaced from each other to hold a clearance 14 between their facing circumferences when fitted on the tube T. The inner cylindrical wall 12 is elastically clamped between the free walls 8 and the outer circumference of the tube T whereas the outer cylindrical wall 13 is fitted on the outer circumference of the connector body 1.

As has been described hereinbefore, the slender tube connector is constructed such that it can be assembled by depressing the socket member 6 into the connector body 1 and disassembled by pulling out the socket member 6. This structure allows the tube T to be connected and disconnected simply and quickly without any requirement for tools. By the elastic clamping action of the inner cylindrical wall 12 of the cap member 10 according to the enclosing structure, moreover, the engagement of the annular groove 5 can be further ensured while preventing the trailing end of the free walls 8 from being contacted or shocked by the adjacent parts to eliminate the coming-out of the tube T. The complete enclosure can also effectively prevent the invasion of dust or washing water into the connecting bore 4. As a result, it is possible to hold the gas-tightness of the O-ring for a long period and to prevent the tube T in the connecting bore 4 from being locally rusted. Thus, the present invention can provide a remarkably useful tube connector.

What is claimed is:

1. A connector for connecting a slender tube having a forward connecting end and an outwardly bulging wall generally adjacent the forward connecting end, said connector comprising:
    a socket member having opposed leading and trailing ends, the leading end of the socket member being engaged on the slender tube rearwardly of and generally adjacent to the outwardly bulging wall, said socket member further comprising a plurality of free walls extending rearwardly and elastically outwardly from the cylindrical wall to define the trailing end of the socket member, the free walls being in spaced relationship to the slender tube, said free walls having at least one land on an outer circumferential portion thereof;
    a connector body having opposed leading and trailing ends with a stepped connecting bore extending therebetween, a connecting portion being defined generally at the leading end of the connector body, the stepped connecting bore extending through the connector body and having an annular groove formed therein, the trailing end of the connector body being engaged over the forward connecting end of the tube and over the leading end of the socket member such that the annular groove of the connector body engages the land of the socket member, and such that the trailing end of the connector body is disposed forwardly of the trailing end of the socket member; and
    an integrally formed elastic cap member having an inner cylindrical wall engaging the slender tube, the inner cylindrical wall having a leading portion disposed intermediate the tube and the free walls of said socket member, the inner cylindrical wall further having a trailing portion disposed rearwardly of the socket member, an outer cylindrical wall extending integrally from the trailing portion of the inner cylindrical wall, said outer cylindrical wall extending forwardly over the trailing ends of the socket member and the connector body, whereby the outer cylindrical wall of the elastic cap covers and protects the socket member and the connector body, and whereby the inner cylindrical wall of the cap member prevents the free walls of the socket member from deflecting inwardly and out of engagement with the annular groove of the connector body.

2. A slender tube connecting connector according to claim 1, further comprising an O-ring sandwiched between the bulging wall of said tube and the cylindrical wall of said socket member.

3. A slender tube connecting connector according to claim 1, wherein said cap member is made of a resin.

4. A slender tube connecting connector according to claim 1, wherein said cap member is made of rubber.

5. A slender tube connecting connector according to claim 1, wherein the connecting portion of said connector body has a threaded face.

6. A slender tube connecting connector according to claim 1, wherein said tube is made of a resin or metal.

* * * * *